April 1, 1952   K. L. SCHIFF   2,591,302
SEAM WELDED BLANKS AND METHODS OF MAKING THEM
Filed Nov. 12, 1949
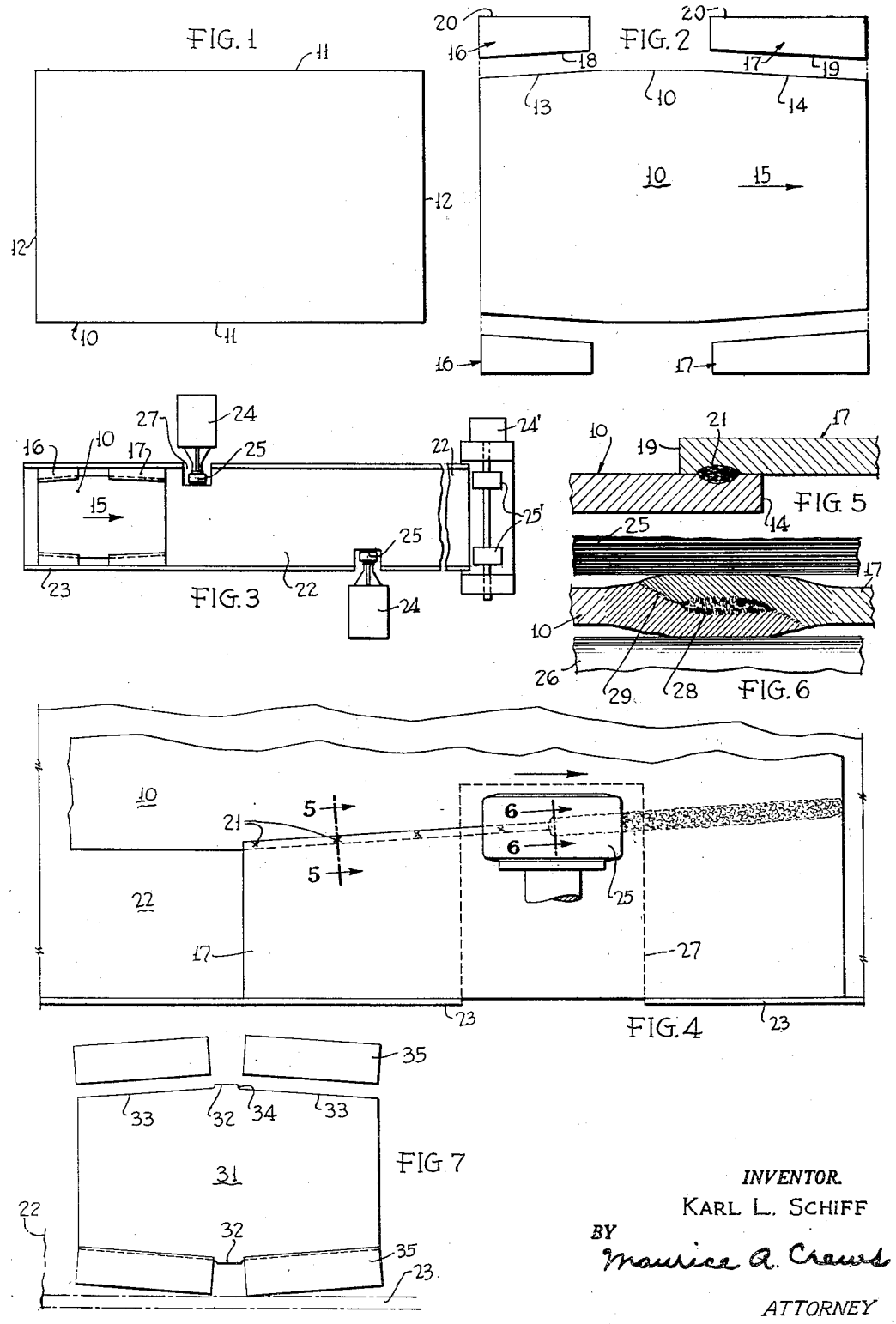
INVENTOR.
KARL L. SCHIFF
BY Maurice A. Crawd
ATTORNEY Patented Apr. 1, 1952

2,591,302

UNITED STATES PATENT OFFICE 2,591,302

SEAM WELDED BLANKS AND METHODS OF MAKING THEM

Karl L. Schiff, Philadelphia, Pa., assignor to The Budd Company, Philadelphia, Pa., a corporation of Pennsylvania Application November 12, 1949, Serial No. 126,790

11 Claims. (Cl. 219—10)

The invention relates to blanks or sheets, each comprising two or more smaller sheets marginally interconnected by seam welds, particularly mash seam welds. The invention also relates to methods of fabricating such composite blanks.

Objects of the invention are simple and economical means for increasing the life of the roller electrodes and the length of the intervals between redressings of such electrodes, and improvements of the quality and uniformity of the welds desirable for subsequent die or other shaping of the blanks.

The importance of these objects in the mass production of blanks, such as blanks later on to be die-formed, will become apparent from the fact that mash-welding involves heating the narrowly overlapping margins of the individual sheets to welding temperature and simultaneously forging them by the welding rollers so that the finished weld is merely a small fraction of an inch thicker than the sheet gauge. Such procedure involves heating of the momentary contact points of the electrodes to a very high temperature and subjecting them simultaneously to very high specific pressure. This leads to grooving and pitting of the contact surfaces of the electrodes after rather short times of use, causing welds of inferior quality and requiring frequent redressing, or even exchange of the rollers with corresponding waste of time and expense.

Previous suggestions for solving the above briefly outlined problems require special, relatively complicated and expensive welding machinery, in which electrodes and work support are movably guided relative to each other so as to move the contact points axially across the width of the welding rollers.

The invention solves the problem by arranging the seam between the individual sheets slightly askance or inclined to a main axis or a margin of the composite blank and thereby to the normal, that is: the customarily employed direction of the movement of the blank through the welding machine vertically to the axial plane of the welding rollers. This does not require any specific welding equipment or work supports but may be carried out with the customary simple welding equipment having the above outlined shortcomings, except for employing wider welding rollers.

A more complete understanding of the invention and of its objects and advantages will be obtained from the embodiments illustrated in the attached drawing and now to be described.

In the drawing:

Figure 1 is a small-scale plan view of an ordinary rectangular metal sheet;

Figure 2 is a plan view of the same sheet having its side margins trimmed, and of four smaller sheets or ears to be welded together in accordance with the invention;

Figure 3 is a diagrammatic fragmentary plan view on a still smaller scale, of a guide and support for a sheet per Figure 2 with tacked on ears, of roller welders for mash-welding the ears to the sheet; and of squeeze rollers for reducing the thickness of the weld seams.

Figure 4 is a larger scale fragmentary plan view of one corner of the sheet with one ear, of the supporting guide, and of one welding roller in the course of mash-welding the ear to the sheet;

Figure 5 is a still larger scale fragmentary diagrammatic section along line 5—5 of Figure 4, through the overlapping tack-welded margins of sheet and ear;

Figure 6 is a fragmentary section along line 6—6 of Figure 4 through the mash-welded margins of sheet and ear, together with a fragmentary view of the contact surfaces of the upper and lower welding rollers; and Figure 7 is a view, similar to Figure 2, of a differently trimmed sheet and of differently shaped ears, illustrating a modification of the invention.

Figure 1 shows an ordinary rectangular sheet 10, having parallel side margins 11 and transverse end margins 12. This sheet 10 is too small, sometimes in certain regions only, to serve as blank for making certain articles, such as by die-stamping or drawing. A larger rectangular single sheet of sufficient size is often unduly expensive or not obtainable. It is known to cope with this situation by welding together several sheets or by welding one or more smaller sheets or ears to one large sheet into a blank of the required size and shape.

Figure 2 shows sheet 10 with its side margins 11 trimmed off at 13 and 14, so that the trimmed marginal portions converge at a small angle toward the longitudinal center line or main axis (arrow 15) of the sheet. Figure 2 shows furthermore two pairs of ears 16 and 17, having margins 18 and 19 respectively cut at the same angle with their opposite side margins 20, the latter extending at right angles to their end margins.

Sheet 10 and ears 16, 17 are tack-welded together by relatively widely-spaced spot-welds 21, Figures 4 and 5, so that their margins overlap each other for a known, accurate, pre-determined distance, the required distance being the same as for known mash-welding processes.

The trimming of sheet 10 and the cutting or trimming of the ears 16, 17, as well as the tack-welding, may be done by machinery and tools which differ from known tools merely in the inclined arrangement, corresponding to the inclination of the margins 13, 14 and 18, 19, of the cutters and of the gauges and spot-welding electrodes for tacking sheet and ears together.

Sheet 10 with tacked-on ears 16, 17 is now placed, see Figure 3, on a supporting table 22 having marginal upwardly-projecting ridges 23 for engaging the margins 20 of the ears and for guiding the sheet on the table for movement in its longitudinal direction 15 paralleling the margins 20. On each side of the table 22 is an electric seam-welder 24, having the interfaces of its upper and lower welding rollers 25, 26 (Figure 6) arranged at about the level of table 22 and projecting into lateral recesses 27 of the table so as to engage the overlapping margins of sheet and ears.

The welding rollers 25, 26 electrically heat the overlapping margins of sheet and ears and simultaneously forge them together, resulting in a mash-weld of the type shown in Figure 6 which is only slightly thicker than and gradually merges into the adjoining portions of sheet and ear, and in which the overlapping portions are firmly bonded together throughout by the welding nugget 28 and lateral extensions 29 thereof. Subsequently, the welded seams may be reduced in thickness by passage between squeeze rollers 25' of machine 24'.

The overlapping margins of sheet and ears move, during their passage through the machines 24 and 24' from one end of the rollers 25, 25' toward the other end. This means that progressively different axial regions of the rollers come in contact with the work and cause gradual, about uniform, wear of the large contact surfaces. Grooving of the roller surfaces is consequently prevented and the rollers will now show objectionable signs of pitting or other wear for long periods of use after installation or redressing.

The contact surfaces of the welding rollers 25 must be wide enough to accommodate the entire length of the respective seam during the welding operation. This means that, in passing of sheets through the machine, the vertical projection of the connecting seam on the axes of the welding rollers has to lie between the ends of the rollers. Conversely, the seam should be arranged at such a small angle that its projection on the welding roller axes does not exceed the width of the contact surfaces of the rollers. It follows that the size of the angle which the seam includes with the direction of movement of the sheets through the machine depends to a certain degree on the length of the seam and the width of the rollers to be used. It is advantageous to make this angle such that the entire width of the welding rollers comes into play. Obviously no definite size for said angle can or needs to be given, but the angle should preferably be relatively small so as to avoid undue waste of material in trimming the margins and to proceed with the welding nearly in the direction of the seam.

It is advantageous to arrange, as shown in the embodiment, the inclined seams so that they converge toward that end of a sheet which they adjoin. If, as in Figure 2, two short sheets 16 and 17 are to be connected, the one behind the other, to one margin of a long sheet 10, the inclined portions 13, 14 of the margin 13, 14 preferably diverge from their adjacent ends in directions toward the ends and the opposite margin of the long sheet.

In the embodiment illustrated in Figure 7, sheet 31 has its longitudinal side margins 32 trimmed along lines 33. These lines are inclined as in the first embodiment and are in addition inwardly offset at 34 with respect to the remaining middle portion of each side margin 32. The ears 35 are of rectangular shape and attached to sheet 31, so that their side margins parallel the inclined trimmed margins of sheet 31. After tacking together sheet 31 and ears 35, as shown in the lower part of Figure 7, the composite sheet is guided through the welding machines by table 22 and its marginal ridges 23, fragmentarily indicated by dot-and-dash lines in Figure 7.

As mentioned before, the advantageous results are achieved without any complication in known machinery or procedure by the slight inclination of the welding seams relative to the normal or customary direction in which the seams had been arranged or moved hitherto.

Similar additional advantages will accrue when the welded seam is subsequently passed between high-pressure rollers or other tools extending transversely to the direction of movement and serving e. g. for reducing the thickness of the seams. The inclined arrangement will again distribute the wear and prolong the life of such rollers or devices.

Those skilled in the art will easily recognize that the invention is not restricted to the illustrated and described specific embodiments but that the invention, without departing from its spirit, is susceptible to modifications and adaptations. Two coextensive sheets may, for instance, be united by cutting their adjoining margins at a slight angle to their opposite outer side margins. Another example of a modification is the arrangement of the connecting margins along lines other than straight lines as long as the directions of the margins or of their different sections deviate slightly from the normal direction of movement of the sheets through the welder and causes the progressive transverse shift of the momentary points of contact with the welding rollers or other working tools.

What is claimed is:

1. In a method of seam-welding adjoining margins of two sheets together, the step of arranging said margins at a small angle to the normal direction of movement of the sheets through a roller-welding machine, such normal direction being at right angles to the axes of the welding rollers, and the step of guiding such sheets in said normal direction between two opposed rollers of such machine in using rollers of a width at least equal to the projection of said margins on the axes of rotation of said rollers.

2. In a method according to claim 1, the further step of passing the welded sheets in said normal direction between tools, such as squeeze rollers, extending transversely to said direction and serving for reducing the thickness of the seam with the effect that the engagement of said welded margins with the tools shifts transversely along said tools.

3. In a method of seam welding a sheet extension by one of its margins to one margin of a rectangular sheet, the step of trimming said last named margin at least in part at a small acute angle with its original location, the step of preliminarily attaching said trimmed margin to said one margin of said extension, and the step of moving said sheet and extension with their attached margins in the direction of the location of said original margin and between two wide rollers of the machine at right angles to the axes of such rollers while applying welding current, with the effect that said attached margins on their way through the machine are engaged successively by different axial regions of the contact surfaces of the rollers.

4. In a method of seam-welding two sheets together, the step of cutting at least one of said sheets so that its margin to be welded to the other sheet is slightly inclined relative to its opposite margin, and the step of sending the two sheets together through a roller welding machine in guiding them by said opposite margin at right angles to the axes of the two cooperating welding rollers with the effect that the momentary points of contact of the seam with the welding rollers gradually shift in axial direction from one end of the rollers toward their opposite end.

5. In a method of working overlapping margins of two sheets, the steps of arranging said margins at a small angle to the normal direction of movement of the sheets through a machine, that is: vertically to the axial plane of the welding rollers, and the step of guiding said sheets in said direction through a machine provided with working tools extending transversely to said direction, so that the points of contact between said margins and said tools progressively shift across the extent of the tools.

6. In a method of seam-welding successive regions of one margin of a large sheet to one margin each of two smaller sheets, the step of cutting said first margin so that its said regions are slightly inclined and diverge toward the end of said large sheet relative to the original location of said first margin, and the step of sending the large sheet and at least one of the smaller sheets together through a roller welding machine in guiding them in the direction of the original location of said first margin and at right angles to the axes of the welding rollers, with the effect that the momentary points of contact of the said regions of the first margin and of said margins of the smaller sheets with the welding rollers gradually move from one side of the rollers toward their opposite side in axial direction.

7. In a method of seam-welding one end region of a margin of one sheet to the margin of another shorter sheet, the step of cutting said end region so that it intersects at a small angle the adjoining region of said first margin, and the step of sending the two sheets together through a roller welding machine in guiding them in the direction of said adjoining region of said first margin and at right angles to the axes of the welding rollers, with the effect that the momentary points of contact of the seam with the welding rollers gradually move from one side of the rollers toward their opposite side in axial direction.

8. Sheet metal blank marginally seam welded together of two smaller blanks, the seam connecting the sheets being arranged at a small angle to one of the main axes of one of said sheets.

9. Sheet metal blank comprising two lateral sheets connected by seam welds to opposite margins of a middle sheet, said margins converging toward and adjoining one end of the middle sheet.

10. Sheet metal blank comprising a long sheet and two shorter sheets, the latter connected by a seam weld each, the one behind the other, to one margin of said long sheet, said seam welds diverging at a large obtuse angle from their adjacent ends in directions towards the ends and the opposite margin of said long sheet.

11. Sheet blank comprising two sheets connected by a seam weld along adjoining margins with each other, said margins and seam weld extending at a small angle to at least one of the opposite margins of said sheets.

KARL L. SCHIFF.

REFERENCES CITED

The following references are of record in the file of this patent:

UNITED STATES PATENTS

| Number | Name | Date |
|---|---|---|
| 1,407,001 | Schroeder | Feb. 21, 1922 |
| 1,519,063 | Schroeder | Dec. 9, 1924 |
| 1,527,084 | Schroeder | Feb. 17, 1925 |
| 2,050,026 | Tarbox | Aug. 4, 1936 |